US012808326B2

(12) United States Patent
Powell et al.

(10) Patent No.: US 12,808,326 B2
(45) Date of Patent: Nov. 24, 2026

(54) REHEATER INTERFACE

(71) Applicant: ROLLS-ROYCE plc, London (GB)

(72) Inventors: Ashley J. Powell, Derby (GB); Eduardo Romero, Derby (GB); Andrew Wilkinson, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 19/407,648

(22) Filed: Dec. 3, 2025

(65) Prior Publication Data

US 2026/0177009 A1 Jun. 25, 2026

(30) Foreign Application Priority Data

Dec. 19, 2024 (GB) ..................................... 2418688

(51) Int. Cl.

*F02C 7/224* (2006.01)
*F02C 7/28* (2006.01)
*F02K 1/80* (2006.01)
*F02K 3/10* (2006.01)

(52) U.S. Cl.

CPC ................ *F02C 7/224* (2013.01); *F02C 7/28* (2013.01); *F02K 1/805* (2013.01); *F02K 3/10* (2013.01)

(58) Field of Classification Search

CPC . F02C 7/224; F02K 1/80; F02K 1/805; F02K 1/82; F02K 3/10; F23R 3/20; F23R 3/08; F23R 3/10; F05D 2240/57

See application file for complete search history.

(56) References Cited

U.S. PATENT DOCUMENTS

| | | | | | |
|---|---|---|---|---|---|
| 3,721,460 | A * | 3/1973 | Holman | B64D 33/02 285/224 |
| 4,413,477 | A * | 11/1983 | Dean | F23R 3/42 60/757 |
| 5,560,198 | A | 10/1996 | Brewer et al. | |
| 8,726,670 | B2 | 5/2014 | Bachman et al. | |
| 2019/0078453 | A1 * | 3/2019 | Roberge | F02K 3/077 |
| 2023/0392518 | A1 | 12/2023 | Joret et al. | |
| 2023/0407813 | A1 | 12/2023 | Joret et al. | |
| 2024/0003315 | A1 | 1/2024 | Joret et al. | |

OTHER PUBLICATIONS

Great Britain search report dated Jun. 16, 2025, issued in GB Patent Application No. 2418688.4.

European search report dated Apr. 22, 2026, issued in EP Patent Application No. 25217582.3.

* cited by examiner

*Primary Examiner* — Justin D Seabe

(57) ABSTRACT

A turbine exit diffuser for a gas turbine engine, the turbine exit diffuser comprising: an exhaust duct arranged to receive flow from a turbine; and a plurality of fingers extending axially downstream and radially away from the exhaust duct, each finger of the plurality being circumferentially spaced apart from an adjacent finger of the plurality, wherein the fingers are arranged to contact a reheater during attachment of the reheater to the turbine exit diffuser.

11 Claims, 3 Drawing Sheets

REHEATER INTERFACE

CROSS REFERENCE TO RELATED APPLICATIONS

This specification is based upon and claims the benefit of priority from United Kingdom Patent Application No. 2418688.4, filed on 19 Dec. 2024, the entire contents of which are incorporated herein by reference.

BACKGROUND

Technical Field

This disclosure relates to an interface between a reheater and a gas turbine exhaust.

Description of the Related Art

While gas turbine jet engines may be used to power vehicles such as aircraft, a reheat assembly may be provided onto the gas turbine jet engine in order to increase the maximum thrust available to propel the vehicle.

There may be a desire to couple the jet engine to the reheat assembly in such a manner that any flow mixing or leakage between the jet engine and the reheat assembly is minimised in order to improve the efficiency of the engine.

Further, a coupling between the jet engine and the reheat assembly may be difficult to assemble in some cases and so it is a design constraint of a reheater to gas turbine interface that the assembly should allow ease of manufacture.

SUMMARY

According to a first aspect of the disclosure, there is provided a reheater to gas turbine interface comprising:

a turbine exit diffuser comprising:

an exhaust duct arranged to receive flow from a turbine; and a plurality of fingers extending axially downstream and radially away from the exhaust duct, each finger of the plurality being circumferentially spaced apart from an adjacent finger of the plurality, wherein the fingers are arranged to contact a reheater during attachment of the reheater to the turbine exit diffuser; and the reheater duct comprising:

a reheater duct body arranged to allow a core gas flow therethrough and to separate the core gas flow from a bypass gas flow outside the reheater duct body; and a plurality of first leaves extending axially upstream from the reheater duct body, each first leaf being separated from an adjacent first leaf by a first slit that extends axially downstream from an upstream end of the first leaves, wherein the first leaves are arranged to abut an exhaust duct of a gas turbine engine to form a seal between the reheater duct body and the exhaust duct, wherein an axially upstream end of the reheater duct is received in or receives the exhaust duct such that the reheater duct and the exhaust duct form a sealed interface.

In an embodiment, the fingers of the plurality of fingers are each separated from an adjacent finger by a respective gap, and each gap has a greater width than each finger.

In an embodiment, the fingers extend radially outwardly from the exhaust duct.

In an embodiment, the turbine exit diffuser has between 3 and 10 fingers.

In an embodiment, the axially upstream end of the reheater duct comprises a plurality of second leaves, each second leaf being separated from an adjacent second leaf by a second slit, the second leaves extending axially upstream from the reheater duct body being arranged radially inside the first leaves.

In an embodiment, a centreline of each second leaf is radially aligned with one of the first slits, and/or wherein a centreline of each first leaf is radially aligned with one of the second slits.

In an embodiment, at least one of: each first slit is narrower than each first leaf or each second slit is narrower than each second leaf.

In an embodiment, at least one of the plurality of first leaves or the plurality of second leaves is integrally formed with the reheater duct body.

In an embodiment, the reheater to gas turbine interface may further comprise an aerodynamic deflector arranged on the exhaust duct, the aerodynamic deflector extending radially from the exhaust duct and being positioned upstream of the upstream end of the reheater duct, the aerodynamic deflector being arranged to divert flow around the upstream end of the reheater duct.

In an embodiment, the reheater to gas turbine interface may further comprise a sealing ring arranged on the exhaust duct, the sealing ring extending radially from the exhaust duct toward the reheater duct and abutting the first leaves of the reheater duct around the circumference of the reheater duct.

According to a third aspect of the disclosure, there is provided a gas turbine engine comprising: an engine core; a reheater; and a reheater to gas turbine interface, the reheater to gas turbine interface coupling the engine core and the reheater together.

In an embodiment, the reheater may be a mix and burn reheater.

According to a fifth aspect of the disclosure, there is provided an aircraft comprising a gas turbine engine according to the third aspect.

Any of the optional features and properties discussed above with reference to the first, second and third aspects may be applied analogously to the other aspects.

BRIEF DESCRIPTION OF THE DRAWINGS

The present disclosure will now be described, by way of example only, with reference to the appended drawings, in which.

DETAILED DESCRIPTION

Figure 1:
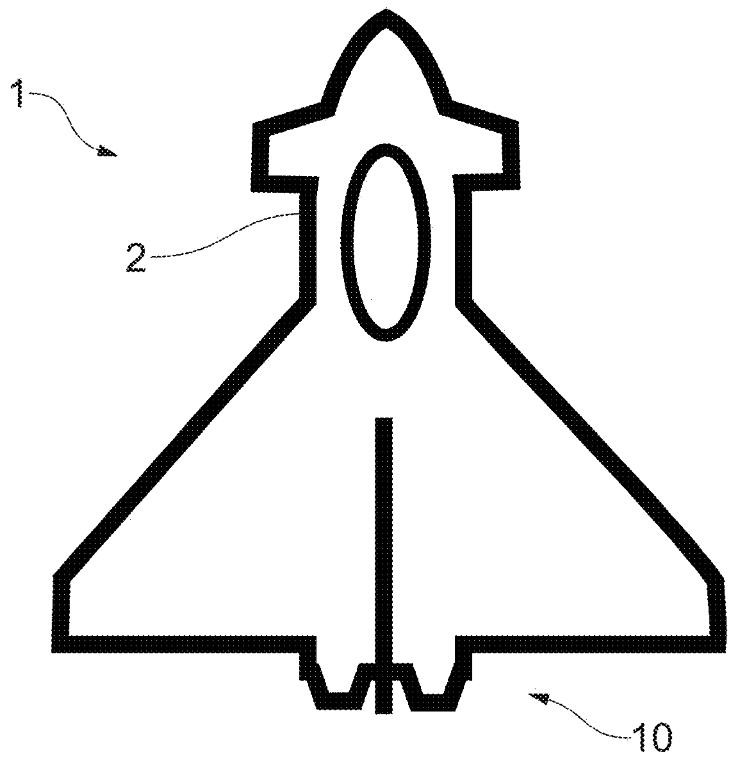
FIG. 1 is a simplified top view of an aircraft comprising an airframe and a propulsion machine.

FIG. 1 shows a simplified and schematic view of an aircraft 1 comprising an airframe 2 and a gas turbine engine

10. The gas turbine engine 10 may be in accordance with the gas turbine engine 10 described below with reference to FIG. 2.

Figure 2:
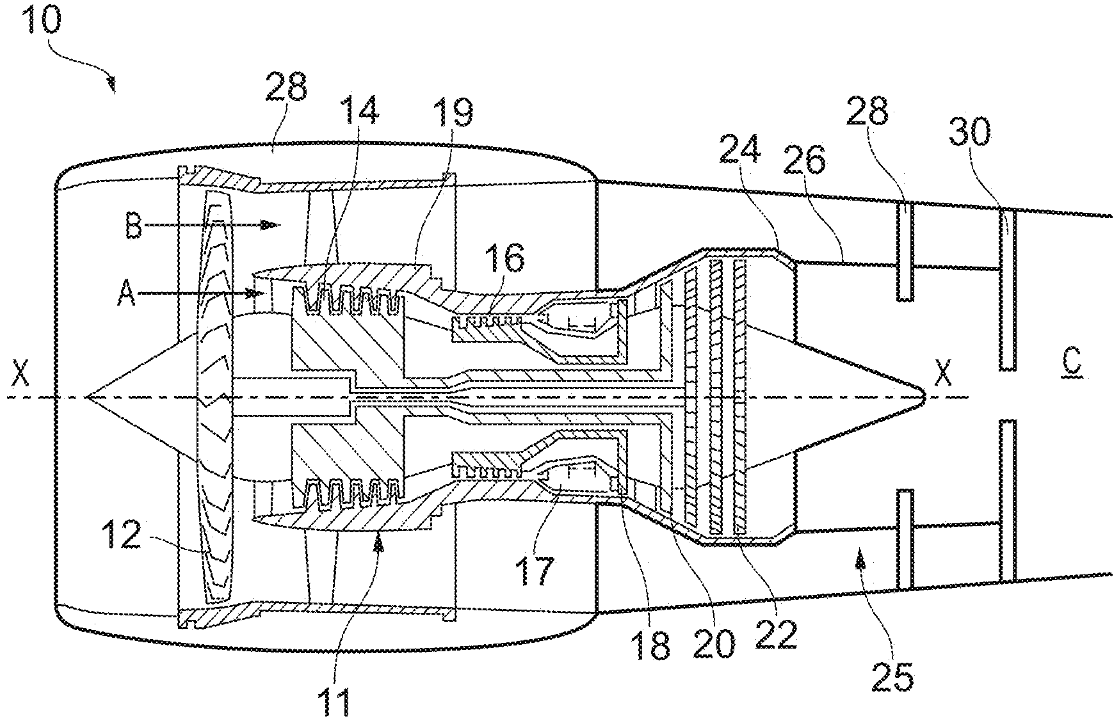
FIG. 2 is a sectional side view of a gas turbine engine.

FIG. 2 shows a cross-sectional view of a gas turbine engine 10. The gas turbine engine 10 includes a gas turbine 11. The gas turbine 11 includes a bypass fan 12 which is arranged to draw air into the gas turbine engine 10 including two flows of air: a core flow A that flows through the gas turbine 11 and a bypass flow B that flows around the gas turbine 11.

The core flow A flows through the gas turbine 11 including an intermediate-pressure compressor 14, a high-pressure compressor 16, a combustion chamber 17, a high-pressure turbine 18, an intermediate-pressure turbine 20 and a low-pressure turbine 22 of the gas turbine 11. It will be understood that mechanical power from each turbine 18, 20, 22 may be transferred to a respective compressor and the fan 12, 14, 16. Each compressor, turbine and fan may be rotatable about a central axis X. The gas turbine 11 may be contained within a core casing 19.

After flowing through the gas turbine 11, the core flow A exits via a turbine exit diffuser 24. The Core flow A may then pass through a reheater 25.

The gas turbine 11 may be contained within an outer casing or nacelle 28. The bypass flow B may be drawn in by the bypass fan 12 and may pass through the nacelle 28 outside the core casing 19 of the gas turbine 11. The bypass flow B may then pass through the reheater 25.

After passing through the reheater 25, the core flow A and bypass flow B may recombine and form a nacelle exit flow C.

The reheater 25 may include a reheater duct 26 that is coupled to the turbine exit diffuser 24 at a reheater to gas turbine interface. The reheater duct 26 is arranged to maintain a separation in the core flow A and bypass flow B in order to avoid losses due to shear between the flows moving at different speeds.

The reheater 25 also includes one or more fuel injectors 28. The fuel injectors 28 may be arranged to inject fuel into the core flow A and the bypass flow B. The core and bypass flows A, B may be at temperatures below auto-ignition temperatures such that the resultant fuel-air mixture does not combust at the point of fuel injection. The reheater 25 therefore may also comprise one or more flameholders 30, which are arranged to ignite the fuel-air mixtures in the core flow A and the bypass flow B. The flameholders 30 may be arranged to ignite the core flow A and the bypass flow B as the two flows mix in a "mix and burn" arrangement. A mix and burn reheater may be arranged to cause combustion in the gases of a bypass flow and a core flow as the two flows mix together, i.e. the core and bypass flows are unable to mix upstream of a flameholder of the reheater. To this end, the reheater duct may be shaped so as to provide a wake-stabilised region downstream of the reheater duct.

The reheater 25, and in particular the reheater duct 26 thereof, may be coupled to the gas turbine 11, and in particular to the turbine exit diffuser thereof, at a reheater to gas turbine interface.

Figure 3:
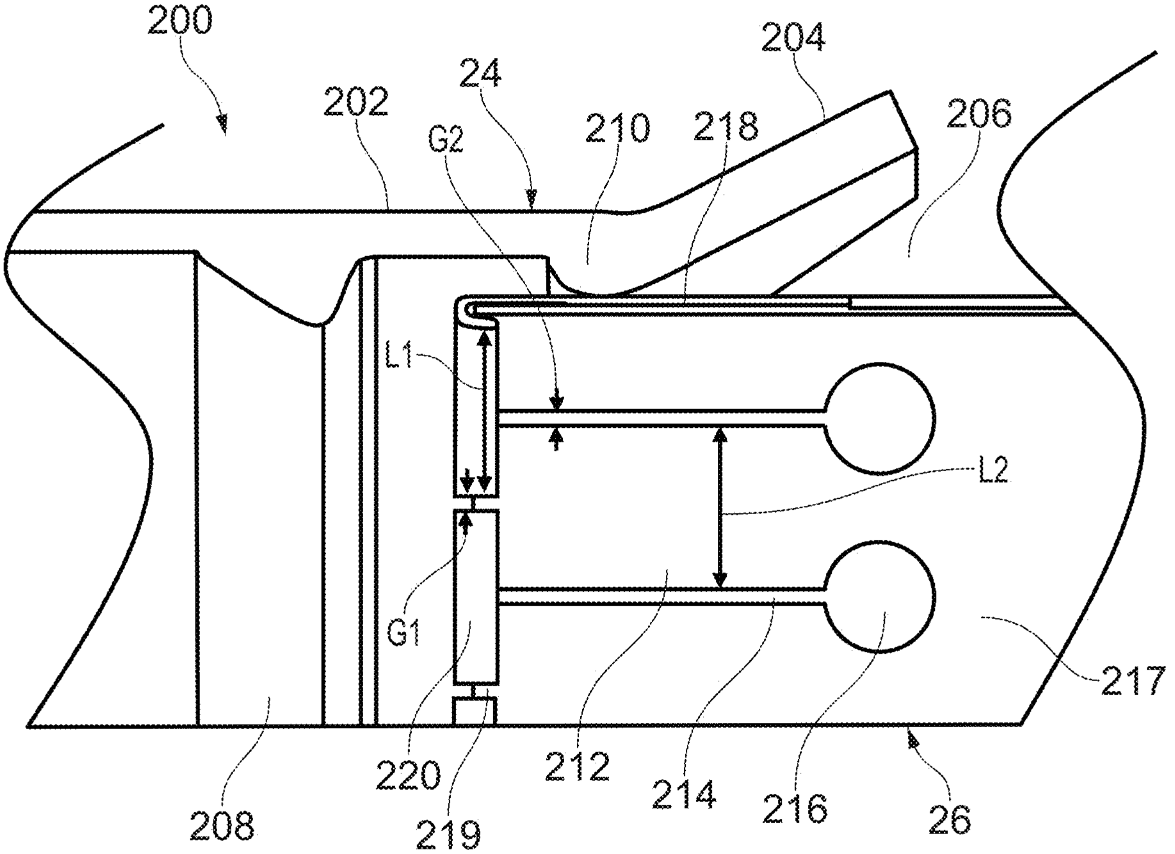
FIG. 3 shows a cross-sectional view of a reheater to gas turbine interface according to the present disclosure.

FIG. 3 shows such a reheater to gas turbine interface 200. The reheater to gas turbine interface 200 is a point where the turbine exit diffuser 24 joins to the reheater duct 26. The turbine exit diffuser 24, shown also end-on in FIG. 4, includes an exhaust duct 202 and a plurality of fingers 204 extending from the exhaust duct 202.

In a jet engine assembly method, a reheater duct may be inserted into an engine axially in order to couple the reheater duct to an exhaust duct. In this case, it may be difficult to locate the reheater duct relative to the exhaust duct. While attempts have been made to modify the relevant parts to make location easier, such modifications have had undesirable effects in terms of flow blockage and have therefore reduced engine efficiency.

By providing fingers extending from the exhaust duct that extend radially and downstream, the reheater duct may be located relative to the exhaust duct more easily, and the flow blockage caused by the locating means, i.e. the fingers, may be reduced.

The fingers 204 are arranged to support the reheater duct 26 during assembly and to guide the reheater duct 26 into place relative to the exhaust duct 202. During assembly, the reheater duct 26 may be inserted axially along the axis X into the engine 10. Due to the constraints of the nacelle 28, it may be difficult to support the upstream end of the reheater duct 26 during this assembly step, which may therefore be referred to as a blind assembly. Consequently, misalignment of the exhaust duct 24 and the reheater duct 26 is possible.

The fingers 204 combine to form a funnel to guide the reheater duct 26 into the exhaust duct 202, such that the reheater duct 26 may be more easily inserted into the exhaust duct 202. The fingers 204 therefore extend downstream from the exhaust duct 202 and radially outwardly. The fingers 204 may be considered as extending diagonally, as seen in a radially cross section. Generally, the fingers 204 may each form a portion of a cone shape, which may be an arcuate portion of a cone shape, the cone shape having a radius that increases in a downstream direction. This shape may also be referred to as a portion of a conical annulus. Since the bypass flow velocity may be slower than the flow velocity of the core flow, any reduction in efficiency of the engine due to the fingers may be reduced by the fingers extending radially outwardly.

In an alternative design, the reheater duct 26 may be arranged outside the exhaust duct 202. In this case, the fingers 204 may extend downstream and radially inwardly from the exhaust duct 202. The fingers 204 may, in this case, each form a portion of a cone having a radius that reduces in a downstream direction.

The reheater duct 26 has an upstream end that is arranged to be received in the exhaust duct 202. The reheater duct 26 has a reheater duct body 217 that is substantially cylindrical and annular to allow the core flow A to flow through it and to allow the bypass flow B to flow around it.

The reheater duct 26 has a plurality of leaves 212, 218 that extend upstream from the reheater duct body 217. Specifically, the reheater duct 26 has two layers of leaves 212, 218 extending upstream from the reheater duct body 217. A first plurality of leaves 218 is a radially outer layer of leaves 218. The leaves 218 of the first layer of leaves 218 are separated by slits 219.

The first leaves 218 may each have a leaf width L1 and the first slits 219 may each have a slit width G1. The leaf width L1 may be at least 10 times greater than the slit width G1. In this way, the leaves may form a substantially complete cylindrical surface for sealing the exhaust duct 202 against the reheater duct 26 and flow leakage via the slits may be reduced.

The first leaves 218 may be arranged to deflect or otherwise elastically deform. Generally, the first leaves 218 may abut the exhaust duct 202 in order to provide a seal between the reheater duct 26 and the exhaust duct 202. The first leaves 218 may have first slits 219 between them in order to allow the first leaves 218 to move relative to each other, such as to accommodate different thermal expansions between the reheater duct 26 and the exhaust duct 202.

The reheater duct 26 may further comprise a plurality of second leaves 212. The second leaves 212 may form a second layer of leaves arranged radially inside the first leaves 218. The second leaves 212 may also be arranged offset from the first leaves 212 such that each second leaf 212 covers a first slit 219. There may be second slits 214 arranged between the second leaves 212 and the second slits 214 may be arranged such that each second slit 214 is covered by a first leaf 218. By providing two layers of leaves, the leaves may overlap and so the prospect of gas leakage between the leaves may be reduced.

The second leaves 212 may each have a leaf width L2 and the second slits 214 may each have a slit width G2. The second leaf width L2 may be at least 10 times greater than the second slit width G2. In this way, the second leaves 212 may substantially cover the first slits 219 and flow leakage via the slits may be reduced. The first and second leaves 218, 212 may have the same widths L1, L2 and the first and second slits 219, 214 may have the same widths G1, G2. In this way, a regular pattern of leaves and slits may be provided, such that no first slit 219 is adjacent any second slit 214.

A centreline of each second leaf 212 may be radially aligned with one of the first slits 219, and/or a centreline of each first leaf 218 may be radially aligned with one of the second slits 214. In this way, gas leakage via the slits 214, 219 may be further reduced, as each slit may be effectively blocked by a radially adjacent leaf.

The slits 214, 219 extend axially along the reheater duct 26 and terminate in stress relievers 216, which may be circular holes formed in the reheater duct 26. The stress relievers 216 may reduce the prospect of crack propagation from the ends of the leaves 214, 219.

In some cases, the reheater duct 26 may have only a single layer of leaves. In this case, the leaves may still form a substantial seal against the exhaust duct 202, although some leakage of gas may occur via the slits. Leakage via the slits may be reduced by the formation of tortuous or stepped slits.

At least one of the first leaves 218 or the second leaves 212 may be formed integrally with the reheater duct body 217. In this way, the number of parts required for constructing the reheater duct 26 may be reduced. Alternatively, the leaves 212, 218 may be formed of separate pieces that are fixed to the reheater duct body 217, such as by welding or riveting.

The first leaves 218 may have overlapping portions 220 that curve around the second leaves 212. In this way, the ends of the second leaves 212 may be surrounded on three sides by the first leaves 218. The overlapping portions 220 may have a surface that is normal to the flow direction along the exhaust duct 202. The overlapping portions 220 may help to reduce a flow of gas between the leaves 212, 218 and may also reduce separation of the leaves 212, 218 and may thereby strengthen the reheater duct 217 in the region of the exhaust duct 202.

The turbine exit diffuser 24 may also include an aerodynamic deflector 208 which may be arranged upstream of the reheater duct 26 and may be arranged to deflect airflow around a leading edge of the reheater duct 26. The aerodynamic deflector 208 may have an upstream side and a downstream side that extend from a surface of the exhaust duct 202, which may be an inner surface of the exhaust duct 202 where the reheater duct 26 is received inside the exhaust duct 202. The upstream side of the aerodynamic deflector may have a shallower gradient relative to the surface of the exhaust duct 202 than the downstream side has. This may reduce drag or recirculation of flow caused by the aerodynamic deflector 208 and may allow the reheater duct 26 to be positioned immediately downstream of the aerodynamic deflector 208. The aerodynamic deflector 208 may extend around the circumference of the exhaust duct 202. In some cases, the aerodynamic deflector 208 may be omitted, such as to reduce manufacturing complexity.

The turbine exit diffuser 24 may include a sealing ring 210. The sealing ring 210 may be a circumferential protrusion from a surface of the exhaust duct 202 which abuts against a surface of the reheater duct 26. Where the reheater duct 26 is received inside the exhaust duct 202, the sealing ring 210 may be a radially inward protrusion extending from an inner surface of the exhaust duct 202. The sealing ring 210 may abut an outer surface of the first leaves 218 and may cause deflection of the first leaves 218 as shown in FIG. 5B. This may improve a seal between the exhaust duct 202 and the reheater duct 26. In some cases, the sealing ring 210 may be omitted, such as to reduce manufacturing complexity.

Figure 4:
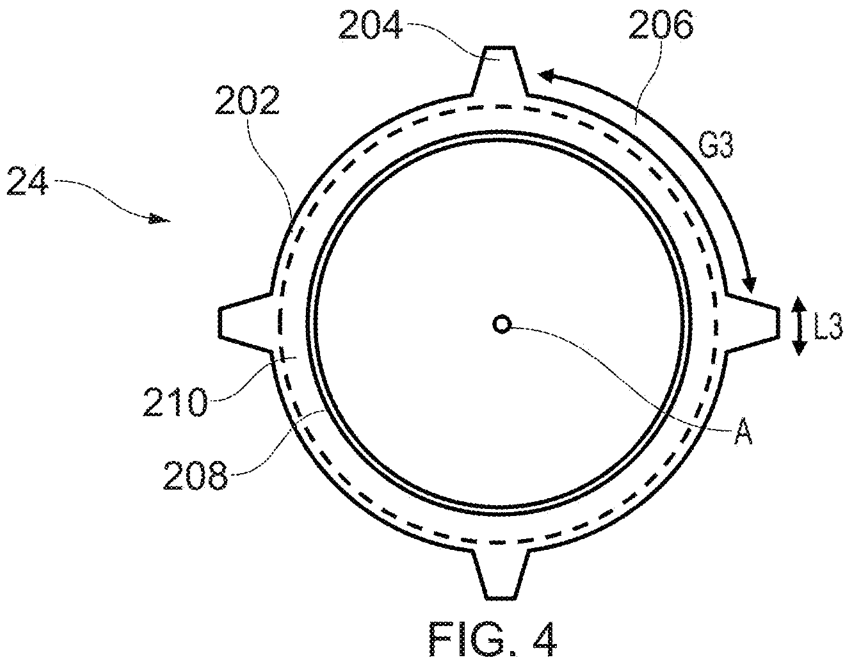
FIG. 4 shows an end view of a turbine exit diffuser for use in a reheater to gas turbine interface according to the present disclosure.

FIG. 4 shows an end view of the turbine exit diffuser 24. In FIG. 4, it can be seen that the fingers 204 may have a width L3 and a gap 206 between the fingers may have a width G3. The gap width G3 may be greater than the finger width L3 and in particular may be at least 10 times greater than the finger width L3. This may reduce blockage of flow through the gas turbine engine 10 while providing support to the reheater duct 26 during assembly.

The finger width L3 may be greater than the gap width G3 in order to provide improved support to the upstream end of the reheater duct during assembly.

Figure 5A:
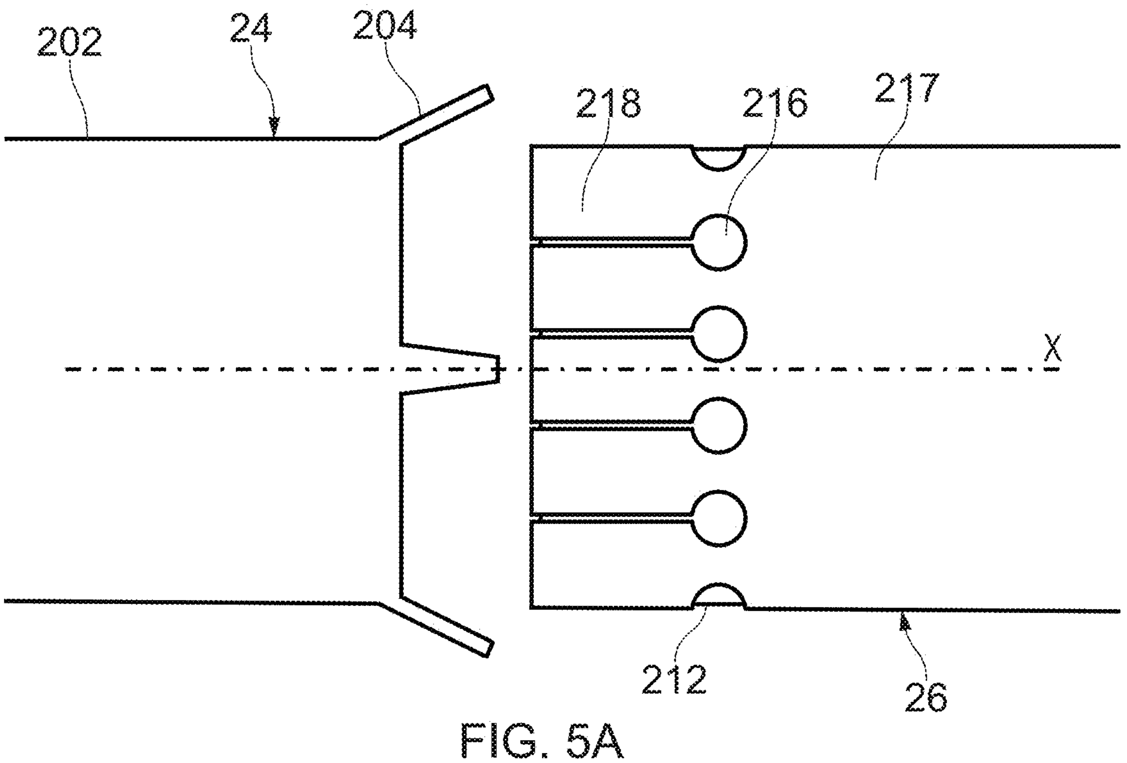
FIG. 5A shows a reheater to gas turbine interface according to the present disclosure at a first stage of assembly.
Figure 5B:
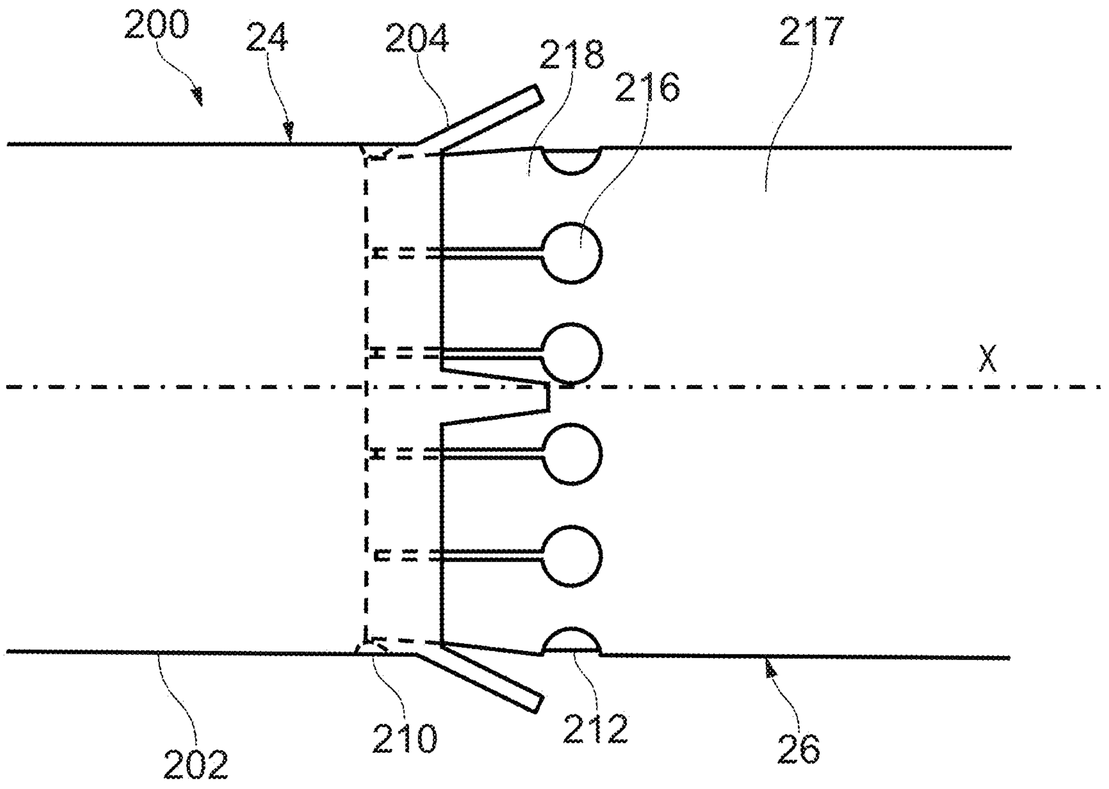
FIG. 5B shows a reheater to gas turbine interface according to the present disclosure at a second stage of assembly.

FIG. 5A shows the gas turbine to reheater interface 200 at an early stage of assembly. It can be seen that the reheater duct 26 may be axially spaced apart from the exhaust duct 202 along the axis X. The axis X may be oriented vertically during assembly and the reheater duct 26 may be lowered into the exhaust duct 202.

The gas turbine to reheater interface 200 may be constructed as shown in FIG. 5B. By insertion of the reheater duct 26 into the exhaust duct 202, the first leaves 218 may contact the sealing ring 210 and the leaves 218, 212 may be deflected by contact with the sealing ring 210, such that the leaves 218 may be urged against the sealing ring 210 by elasticity of the material of the leaves 212, 218.

Further, it can be seen that the fingers 204 may guide the upstream end of the reheater duct 26 into the exhaust duct 202. This may be particularly beneficial where the upstream end of the reheater duct 26 is unsupported during the insertion.

Various examples have been described, each of which comprise one or more combinations of features. It will be appreciated by those skilled in the art that, except where clearly mutually exclusive, any of the features may be employed separately or in combination with any other features and the invention extends to and includes all combinations and sub-combinations of one or more features described herein. The present disclosure is also relevant for land, aviation and marine applications in both civil and military contexts.

We claim:

1. A reheater to gas turbine interface comprising:

a turbine exit diffuser comprising:

an exhaust duct arranged to receive flow from a turbine; and a plurality of fingers extending axially downstream and radially away from the exhaust duct, each finger of the plurality being circumferentially spaced apart from an adjacent finger of the plurality, wherein the fingers are arranged to contact a reheater during attachment of the reheater to the turbine exit diffuser; and a reheater duct comprising:

a reheater duct body arranged to allow a core gas flow therethrough and to separate the core gas flow from a bypass gas flow outside the reheater duct body; and a plurality of first leaves extending axially upstream from the reheater duct body, each first leaf being separated from an adjacent first leaf by a first slit that extends axially downstream from an upstream end of the first leaves, wherein the first leaves are arranged to abut the exhaust duct of a gas turbine engine to form a seal between the reheater duct body and the exhaust duct, wherein an axially upstream end of the reheater duct is received in or receives the exhaust duct such that the reheater duct and the exhaust duct form a sealed interface.

2. The reheater of claim 1, wherein the fingers of the plurality of fingers on the turbine exit diffuser are each separated from an adjacent finger by a respective gap, and wherein each gap has a greater width than each finger.

3. The reheater of claim 1, wherein the fingers of the turbine exit diffuser extend radially outwardly from the exhaust duct.

4. The reheater of claim 1, wherein the turbine exit diffuser has between 3 and 10 fingers.

5. The reheater of claim 1, wherein the axially upstream end of the reheater duct comprises a plurality of second leaves, each second leaf being separated from an adjacent second leaf by a second slit, the second leaves extending axially upstream from the reheater duct body being arranged radially inside the first leaves.

6. The reheater of claim 5, wherein a centreline of each second leaf is radially aligned with one of the first slits, and/or wherein a centreline of each first leaf is radially aligned with one of the second slits.

7. The reheater of claim 5, wherein the first leaves each comprise an overlap portion that extends around an upstream end of at least one second leaf.

8. The reheater of claim 5, wherein at least one of: each first slit is narrower than each first leaf or each second slit is narrower than each second leaf.

9. The reheater duct of claim 5, wherein at least one of the plurality of first leaves or the plurality of second leaves is integrally formed with the reheater duct body.

10. The reheater to gas turbine interface of claim 1, further comprising an aerodynamic deflector arranged on the exhaust duct, the aerodynamic deflector extending radially from the exhaust duct and being positioned upstream of the upstream end of the reheater duct, the aerodynamic deflector being arranged to divert flow around the upstream end of the reheater duct.

11. The reheater to gas turbine interface of claim 1, further comprising a sealing ring arranged on the exhaust duct, the sealing ring extending radially from the exhaust duct toward the reheater duct and abutting the first leaves of the reheater duct around the circumference of the reheater duct.

* * * * *